Figure 1:
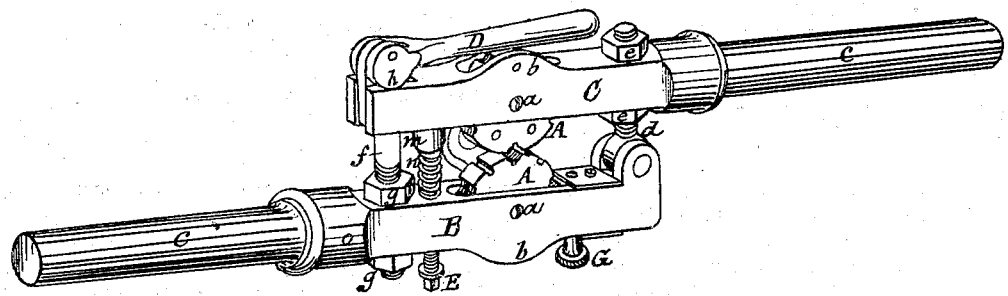

F. D. BLISS.
Screw-Cutting Die-Plates.

No. 152,546. Patented June 30, 1874.

UNITED STATES PATENT OFFICE.

FRANCIS D. BLISS, OF NEW HAVEN, ASSIGNOR TO ALVIN R. PAINE, OF SAME PLACE, AND ABNER C. WETMORE, OF MERIDEN, CONN.

IMPROVEMENT IN SCREW-CUTTING DIE-PLATES.

Specification forming part of Letters Patent No. 152,546, dated June 30, 1874; application filed May 19, 1874.

*To all whom it may concern:*

Be it known that I, FRANCIS D. BLISS, of the city and county of New Haven, in the State of Connecticut, have invented certain new and useful Improvements in Die-Plates.

My improvements relate to plates or stocks for holding that class of screw-cutting dies which are made in two sections, and held in two separately-constructed carriers, and are particularly adapted to cutting screw-threads on pipes, bolts, &c., by hand; and I attain thereby the accurate maintenance of both die-sections in the same plane, the ready expansion of said sections for effecting prompt release from a cut thread, and their prompt and accurate return to their normal working position; the ready adjustment of the carriers and die-sections for service on pipes or bolts of different sizes, and their accurate presentation to the pipe or bolt on which a screw is to be cut; and also, in connection with rotating axial die-sections, said improvements embrace flange-guards for protecting the outer peripheries of said dies, and also a novel means for preventing said dies from rotating on their axes when in working position.

It is to be understood that releasing or expanding die-sections have heretofore been variously mounted, and so arranged that the dies may be readily removed from a thread just cut without backwardly revolving the die-plate, and have also been made in circular form, and provided with a variety of screw-cutting recesses at their peripheries, and that such have been axially mounted on carriers independently constructed, but united by rigid screw-bolts. So also have tubular guides been heretofore employed in connection with sectional and other dies, and a solid plate or holder; and therefore my invention consists, first, in a novel hand-die stock, composed of two independently-constructed die-carriers, parallelly adjustable, provided with handles, connected by a close hinge-joint, and a locking-bolt, located respectively at points adjacent to the ends of said carriers, and on opposite sides of the point at which the dies are held; secondly, in adjustable hinge-joint and locking-bolt connections on said carriers, whereby they may be set at any requisite distance apart; thirdly, in the combination with said hinged carriers of a gage-screw, and in combining with said gage-screw a protecting-cup for maintaining its accuracy as a gage by keeping the face or head of the screw, and the coincident surface on which it bears, free from dirt, &c.; fourthly, in combining with said hinged carriers a tubular guide, which is adjustable laterally thereon, whereby the guide and die-cutting recesses may be coincidently located, whether the carriers be more or less widely separated; fifthly, in the combination, with rotatively-mounted dies, of a spindle-cam for locking them in position.

And I do hereby that the following specification, taken in connection with drawings furnished and forming a part of the same, is a clear and accurate description of a die-plate embodying my several improvements.

Figure 2:
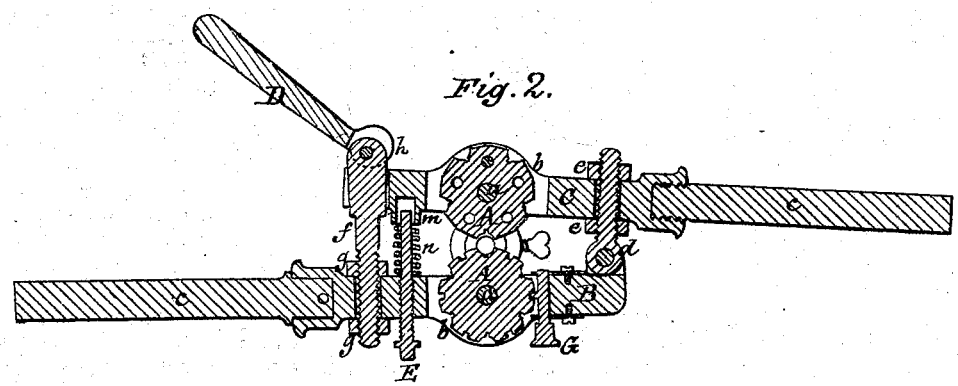
Figure 3:
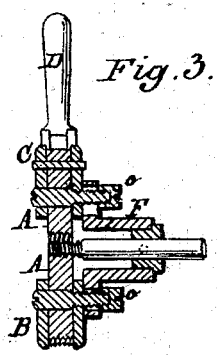
Figure 4:
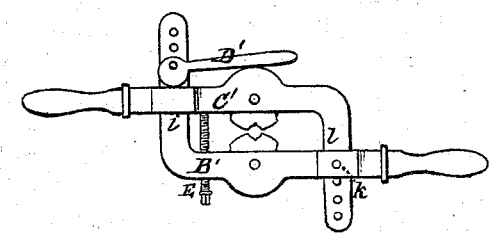

Figure 1 represents the improved die-plate in perspective. Fig. 2 represents the same in longitudinal section. Fig. 3 represents the same in transverse central section. Fig. 4 represents a modified form of my hinged carriers.

The two dies A are represented of a generally circular form, and are of the same diameter, and have an equal number of semi-circular tapped recesses. Each is mounted on an axis at $a$, and both can be revolved so as to coincidently present the desired screw-cutting recesses. B and C denote the carriers, which are slotted transversely to receive the dies, and are drilled at right angles to the slot to receive their axes. Each carrier is provided with protecting flanges, as at $b$, for guarding the outer peripheries of the dies. Each carrier has a handle, $c$, which, in order that the tool may occupy but little space when not in use, is arranged to be readily detached. A tenon and pin is desirable for solid handles, as shown on carrier B; but for ordinary usage the handles may be made of gas-pipe, and connected with the carrier by a screw-thread, as shown on carrier C. The two carriers must be so united to each other that the dies will always occupy the same plane, in order that the tapped recesses in both dies may be always in proper relation with each other for cutting a thread. They should also be so constructed that under any adjustment of the dies to operate on bolts or pipes of different sizes the carriers may be made to retain their parallelism, and this feature constitutes one of the peculiarities of my improvement. At one end of carrier B a bolt, $d$, is hinged, to swing in the plane of the dies, and is provided with a well-fitted close hinge-joint. This bolt passes through a smooth hole in carrier C, which is of slightly greater diameter than the bolt, and two holding-nuts, $e$, serve to rigidly bind the bolt and that carrier together at that point. At the opposite end a locking-bolt, $f$, passes through a hole in the carrier B, and is rigidly secured thereto by means of the nuts $g$. The outer end of the locking-bolt $f$ is flattened and accurately fitted, for the purpose of guiding the carriers and maintaining them and the dies in the same plane, to a square-faced lateral slot in the carrier C, and has hinged to its outer end a cam-lever, D, which is also, for convenience, arranged to swing in the plane of the dies. The cam-face $h$ on the lever D is fitted to bear on the outer side of that end of the carrier C, and when turned in the position shown in Fig. 2 it allows that end of the carrier to move outward; but when the lever is moved toward the dies, it forces that end of the carrier inward, until it occupies a position truly parallel with the carrier B.

In Fig. 4 the two carriers are shown to be similarly constructed. Instead of employing the hinged bolt, however, one end of carrier C' is curved and flattened at $l$, and passes through a lateral slot in carrier B', accurately fitted to receive it, and the close hinge-joint is produced by the introduction of a hinge-pin, as at $k$, thus securing precisely the same movement as if the hinged bolt $d$, already described, had been employed.

A means for adjusting the carriers with relation to each other is also provided in a series of drilled holes in the flattened necks of the carriers. On the other side of the dies in Fig. 4 the carrier B' is also shown to have a curved neck, flattened as at $i$, which passes through a lateral slot in the carrier C', and on this flattened neck a cam-lever, D', is mounted, substantially as described, in connection with the locking-bolt $f$, which, in this case, instead of being separately constructed, is a part or continuation of the carrier B' itself. The lever D' at the cam is slotted sufficiently to pass freely over the end of the neck $i$, which, as in the case of the neck $l$, is also provided with holes corresponding with those in said neck $i$, whereby the cam-lever, by means of its pin, may be adjusted to correspond with the hinged adjustment at $k$.

In order that after being opened for releasing the dies from a cut thread they may be readily returned to their precise normal condition, I employ the gage-screw E, which is tapped through a hole in one of the carriers, and engages with its inner end against the bottom of a recess in the inside face of the opposite carrier, and in order that chips and dirt may not get between its end and the carrier the adjacent bearing-surface is guarded by the protecting-cup $m$. An expansive spring, $n$, encircles the gage-screw, and, by bearing against the top of the cup and the carrier, serves to throw the dies apart, as soon as the lever on the locking-bolt will permit that action.

The tubular guide F has a slotted base, through which screws $o$ pass into the carriers, whereby it may be set with the center of the tubular opening, on a line with the center of the screw-cutting recesses, whether the dies be more or less widely separated.

When the dies are in cutting contact with a pipe or bolt the guide will freely adjust itself to the proper position, and on setting either of the screws $o$, the guide will thereafter cause all succeeding pipes or bolts to be properly presented to the dies.

Bushings of various sizes may be employed with this guide, and be secured therein by a set-screw.

To secure the dies from rotating, pins have hitherto been employed, which pass through coincident holes in dies and carriers. As such are liable to drop out in use, I have devised a positive locking mechanism, which consists in the rotating spindle-cam G, which, on being rotated, enters one of several slots cut in the peripheries of the die between the screw-cutting recesses, and, by engaging therewith, securely holds the die on its axis.

Having thus described my invention, I claim as new—

1. A hand die-plate, for working screw-cutting dies, composed of two independently-constructed parallelly-adjustable die-carriers, provided with recesses for receiving and holding the dies, and connected adjacent to their ends by a close-fitting hinge-joint, and an adjustable locking and guiding device, substantially as described, whereby both carriers and their dies may be maintained in the same plane, and be readily closed and expanded, as specified.

2. The combination of the two parallel carriers with the adjustable hinge-bolt, and the adjustable locking bolt and lever, substantially as described.

3. The parallelly-adjustable die-carriers connected by hinge and locking bolt, substantially as described, in combination with the gage-screw E, for the purposes specified.

4. The combination of the gage-screw with the protecting-cup $m$, substantially as described.

5. In combination with hinged carriers and matched dies, the tubular guide mounted on both carriers, and adjustable laterally thereon, substantially as described.

6. The combination, with a rotative die, of the spindle-cam G, arranged to engage with said die and secure it from rotation, substantially as described.

FRANCIS D. BLISS.

Witnesses:
DEXTER R. WRIGHT,
JULIUS C. CABLE.